United States Patent [19]
Garner

[11] 3,821,128
[45] June 28, 1974

[54] METHOD FOR EXPANDING MICROSPHERES AND EXPANDABLE COMPOSITION

[75] Inventor: Joseph L. Garner, Sanford, Mich.

[73] Assignee: The Dow Chemical Company, Midland, Mich.

[22] Filed: Aug. 5, 1971

[21] Appl. No.: 169,357

[52] U.S. Cl....... 260/2.5 B, 260/29.6 MH, 252/316, 260/23 S, 260/33.6 UA, 260/33.8 UA, 260/87.7, 260/887
[51] Int. Cl. ............................................ C08f 47/10
[58] Field of Search ................................ 260/2.5 B

[56] References Cited
UNITED STATES PATENTS

| | | | |
|---|---|---|---|
| 3,515,569 | 6/1970 | Walters et al. | 260/2.5 B |
| 3,553,114 | 1/1971 | Burt | 260/2.5 B |
| 3,615,972 | 10/1971 | Morchouse et al. | 260/2.5 B |

Primary Examiner—Wilbert J. Briggs, Sr.
Attorney, Agent, or Firm—Robert B. Ingraham

[57] ABSTRACT

Thermoplastic microspheres are readily expanded to low densities by heating in water in the presence of a variety of salts.

10 Claims, No Drawings

METHOD FOR EXPANDING MICROSPHERES AND EXPANDABLE COMPOSITION

Expandable synthetic resinous microspheres provide a convenient source of hollow, gas-filled synthetic resinous particles and are beneficially employed as fillers in synthetic resinous castings as bulking agents, in textiles and paper as thin insulating coatings and the like. Such expandable particles are well known and are set forth in U.S. Letters Pats. No. 3,293,114; 3,401,475; 3,479,811; 3,488,714, 3,556,934; U.S. Pat. application Ser. No. 634,691, filed April 28, 1967, now U.S. Pat. No. 3,615,972; Canadian Patent No. 890,501 and British Pat. No. 1,044,680. Expandable microspheres generally have diameters within the range of 1 to 50 microns and consist essentially of a synthetic resinous thermoplastic shell encapsulating therein a single droplet of a liquid expanding agent such as a low boiling hydrocarbon or other volatile material which is generally a non-solvent for the polymer. On heating the expandable microspheres to a temperature sufficient to cause heat plastification of the shell, the microspheres expand to form a hollow gas- or vapor-filled polymeric shell several times the diameter of the unexpanded sphere. Such microspheres are prepared in an aqueous polymerization system and oftentimes dried and expanded. In many instances, particularly where such microspheres are being employed in an aqueous system such as a coating system where it is desired to employ the microspheres in the expanded form, substantial difficulty has been encountered in obtaining satisfactorily expanded microspheres when they are heated in the presence of water. Generally, when microspheres are employed which expand at temperatures below the boiling point of water, an undesirably low degree of expansion is obtained if water-wetted microspheres are heated in water. If the water is removed; that is, the microspheres are dried and re-slurried and heated to a like temperature within a short period of time, generally a substantially greater degree of expansion is obtained. On standing at room temperature in the presence of water, the dried and re-slurried microspheres appear to lose at least some of their ability to expand in hot water.

It would be desirable if there were available an improved method for the preparation of thermoplastic expandable microspheres in the presence of water.

It would also be desirable if there were available an improved microsphere-containing aqueous composition which would readily permit expansion of the microspheres.

It would further be desirable if there were available a simple and direct technique for the expansion of expandable microspheres in the presence of water to relatively low densities.

These benefits and other advantages in accordance with the present invention are achieved by providing a plurality of expandable synthetic resinous microspheres, the microspheres having a thermoplastic shell symmetrically encapsulating therein a volatile liquid raising agent in an aqueous dispersing medium, the microspheres having on the outer surface thereof a generally continuous coating of an aqueous solution having dissolved therein from 0.15 to 2 hydrogen equivalents per 100 grams of water of a soluble metal salt.

Also contemplated within the scope of the invention is a method for the expansion of expandable synthetic resinous microspheres, the microspheres having a synthetic resinous thermoplastic shell symmetrically encapsulating therein a volatile liquid raising agent and on heating being capable of expanding to form a monocellular particle, the steps of the method comprising contacting a plurality of expandable microspheres with an aqueous medium to coat the outer surface of the individual microspheres, the aqueous medium having dissolved therein from 0.15 to 2 hydrogen equivalents per 100 grams of water of a soluble metal salt, and heating the expandable microspheres in the presence of water to a temperature sufficient to cause expansion thereof to monocellular gas-filled particles.

A wide variety of expandable synthetic resinous microspheres may be employed in the practice of the present invention. Those which are suitable are any expandable synthetic resinous microspheres which heat plastify and expand below the boiling point of water. Particularly advantageous microspheres are those having a shell of a copolymer of from about 60 to 90 parts by weight vinylidene chloride and 40 to 10 parts by weight of another monomer copolymerizable therwith, such as acrylonitrile, and containing about 5 to 30 percent by weight, based on the weight of the copolymer, of an expanding agent such as isobutane, as a distinct and separate liquid inclusion symmetrically encapsulated therein. Other beneficial microspheres are microspheres having a shell of a copolymer of 70 parts by weight vinylidene chloride, 15 parts by weight acrylonitrile and 15 parts by weight methylmethacrylate and containng 14 weight percent isobutane, based on the weight of the microspheres. The expandable microspheres are well known in the art and various microspheres are described in the hereinbefore delineated patents, herewith incorporated by reference.

Any water soluble metal salt capable of dissolving in water under conditions suitable for treating the microspheres above the freezing point of the salt solution and the expansion point of the microspheres may be employed, provided the salt or mixture of salts is sufficiently soluble in water to provide a value of 0.15 hydrogen equivalents per 100 grams of water. Such salts include ammonium chloride; barium chloride; zinc chloride; magnesium chloride; calcium chloride; ferric chloride; sodium acetate; sodium nitrate; trisodium phosphate; disodium phosphate; monosodium phosphate; potassium phosphate; potassium chloride; sodium hexametaphosphate; potassium chromate; ammonium iodate; barium nitrate and the like. Generally it is desirable to select a more commonly available salt which prevents minimal disposal characteristics dependent on the particular waste control system available. Frequently it is feasible to water-wash the expanded microspheres and recover the salt. Particularly beneficial for many applications are salts such as calcium chloride; sodium chloride; magnesium chloride.

Generally in the practice of the method of the invention, it is desirable to admix the salt, water and microspheres by any convenient method, such as by spraying the wet filter cake or dispersing the microspheres in the salt solution and subsequently heating the microspheres to the expanding temperature. It is desirable that at least 0.15 hydrogen equivalents of the salt per 100 grams of water be present in the aqueous dispersing medium. The expandable microspheres may be heated directly in the dispersing medium, or alternately and desirably, the dispersing medium containing the salt compound may be removed from the microspheres such as by filtering. Such a filtering operation generally provides a wet cake which contains about equal parts of the microspheres and retained dispersing medium. The microspheres separated by filtration may then be added to water heated to the desired temperature to cause expansion. If desired, the water may contain binders such as, for example, styrene/butadiene latex particles. Generally in order to obtain optimum expansion, it is advantageous to employ at least 0.4 hydrogen equivalents of the salt per 100 grams of water in treating the expandable microspheres. Usually it is desirable that at room temperature the microspheres remain in the salt-containing dispersion for several hours, such as for a period of from about 5 to 24 hours, or up to several days in order to obtain maximum expansion of the particles. A substantial improvement in expansion characteristics is observed, however, when microspheres are admixed with an aqueous solution of the salt-containing dispersion and immediately heated in water.

The mechanism of the present invention is not clearly understood. However, at temperatures below the temperature at which the microspheres expand, generally the longer the period of treatment at a given temperature (up to about 24 hours), the lower the density of the resultant expanded microspheres. Certain salts such as aluminum sulphate exhibit an optimum treatment time at any given temperature for minimum expanded density of the microspheres. Such optimum time is usually about 24 hours at ambient temperatures.

In the following examples, all densities are apparent true densities which are determined gravimetrically using a dispersion of the expanded microspheres in glycerine.

By way of further illustration, a plurality of samples are prepared by dissolving an appropriate salt at a desired concentration in water, admixing the salt solution with an expandable microsphere filter cake, the filter cake containing about 35 percent water at ambient temperature, the quantity of salt solution employed being sufficient to form a slurry of the microspheres in the salt solution. After admixing, the slurries stand at ambient temperature for about 15 minutes and an aliquot portion of the slurry sufficient to contain about 5 grams of microsphere solids are then admixed with about 400 milliliters of water at a temperature of 75°C. The expanded microspheres are separated from the water by filtration, washed, air-dried at about 25°C. and the apparent true density determined. The results are set forth in Table I which follows.

TABLE I

| RUN NO. | SALT | EQUIVALENTS$_1$ | WT % SALT$_2$ | ATD$_3$ |
|---|---|---|---|---|
| 1 | magnesium chloride | 0.55 | 20.8 | 4.16 |
| 2 | magnesium chloride | 0.77 | — | 4.15 |
| 3 | barium chloride | 0.26 | — | 13.0 |
| 4 | barium chloride | 0.20 | — | 14.8 |
| 5 | aluminum sulfate | 0.33 | — | 11.0 |
| 6 | calcium chloride | 0.135 | — | 12.7 |
| 7 | calcium chloride | 0.293 | — | 6.9 |
| 8 | calcium chloride | 0.70 | — | 4.2 |
| 9 | zinc chloride | 0.163 | 10 | 15.2 |
| 10 | zinc chloride | 0.488 | 25 | 9.6 |
| 11 | zinc chloride | 1.72 | 54 | 4.0 |
| 12 | sodium chloride | 0.54 | 24 | 7.4 |
| 13 | sodium chloride | 0.92 | 35 | 5.0 |
| 14 | ferric chloride | 0.994 | 35 | 4.5 |
| 15 | sodium nitrate | 0.633 | 35 | 5.6 |
| 16 | sodium sulfate | 0.47 | 25 | 8.1 |
| 17 | magnesium chloride | 0.41 | — | 4.3 |
| 18 | magnesium chloride | 0.231 | — | 7.73 |
| 19 | air dried and foamed; no salt | — | — | 3.8 |
| 20 | no salt added | — | — | 14.2 |

FOOTNOTES:
$_1$ = gram hydrogen equivalents per 100 grams of water
$_2$ = based on water
$_3$ = apparent true density in pounds per cubic foot The general procedure of the foregoing experiment is repeated with the exception that the samples are aged for a period of 24 hours prior to expanding in 75°C. water and the results are set forth in Table II which follows.

TABLE II

| RUN NO. | | | MIXTURE | WEIGHT SALT$_1$ | EQUIVALENTS$_2$ | ATD$_3$ |
|---|---|---|---|---|---|---|
| 1 | 50 | grams | microspheres* | | | |
| | 10 | grams | ammonium chloride | 21 | 0.5 | 4.3 |
| | 20 | grams | water | | | |
| 2 | 50 | grams | microspheres* | | | |
| | 15 | grams | sodium acetate | 33.4 | 0.49 | 4.0 |
| | 20 | grams | water | | | |
| 3 | 50 | grams | microspheres* | | | |
| | 17.5 | grams | barium chloride-dihydrate | 21.4 | 0.26 | 6.46 |
| | 34.5 | grams | water | | | |
| 4 | 50 | grams | microspheres* | | | |
| | 12.5 | grams | zinc chloride | 25 | 0.488 | 4.5 |
| | 20 | grams | water | | | |
| 5 | 50 | grams | microspheres* | | | |
| | 5.5 | grams | sodium chloride | 24 | 0.54 | 4.2 |
| 6 | 50 | grams | microspheres* | | | |
| | 20 | grams | ferric chloride | 35 | 0.99 | 4.2 |
| | 20 | grams | water | | | |
| 7 | 50 | grams | microspheres* | | | |
| | 20 | grams | sodium nitrate | 35 | 0.63 | 4.12 |
| | 20 | grams | water | | | |
| 8 | 50 | grams | microspheres* | — | — | 14.2 |

FOOTNOTES:
$_1$ = based on water
$_2$ = gram hydrogen equivalents per hundred grams of water
$_3$ = apparent true density in pounds per cubic foot
* = wet filter cake about 35 weight percent water In a manner similar to the foregoing examples, other expandable microspheres which expand at temperatures below the boiling point of water are readily expanded in the presence of water employing the hereinbefore delineated salts.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A plurality of readily expandable synthetic resinous microspheres, the microspheres having a thermoplastic shell symmetrically encapsulating therein a volatile liquid raising agent and on heating being capable of expanding to form a monocellular particle, the particles being capable of expansion at a temperature below 100°C., the microspheres having disposed on the surface an aqueous solution having dissolved therein from about 0.15 to 2 hydrogen equivalents per 100 grams of water of a soluble metal salt.

2. The microspheres of claim 1 wherein the salt is magnesium chloride.

3. The microspheres of claim 1 wherein the salt is calcium chloride.

4. The microspheres of claim 1 wherein the synthetic resinous thermoplastic shell is a polymer of vinylidene chloride and acrylonitrile.

5. The microspheres of claim 1 wherein the aqueous solution contains at least 0.15 gram hydrogen equivalents of salt.

6. A method for the expansion of expandable synthetic resinous microspheres, the microspheres having a synthetic resinous thermoplastic shell symmetrically encapsulating therein a volatile liquid raising agent and on heating being capable of expanding to form a monocellular particle, the particles being capable of expanding at a temperature below 100°C., the steps of the method comprising contacting expandable microspheres with an aqueous medium, the aqueous medium having dissolved therein from about 0.15 to 2 hydrogen equivalents per 100 grams of water of a soluble metal salt, and subsequently heating the expandable microspheres in the presence of water to a temperature sufficient to cause expansion thereof to monocellular gas-filled particles.

7. The method of claim 6 including the step of removing at least a major portion of the aqueous medium and adding the resultant wet, unexpanded microspheres to water heated to an expanding temperature.

8. The method of claim 6 wherein the salt is calcium chloride.

9. The method of claim 6 wherein the salt is magnesium chloride.

10. The method of claim 6 wherein the monocellular gas-filled particles are separated from the water.

* * * * *